(12) United States Patent
Cunningham et al.

(10) Patent No.: US 7,669,135 B2
(45) Date of Patent: Feb. 23, 2010

(54) USING EMOTICONS, SUCH AS FOR WIRELESS DEVICES

(75) Inventors: Ivy Cunningham, Seattle, WA (US); Christopher White, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 11/092,511

(22) Filed: Mar. 28, 2005

(65) Prior Publication Data

US 2006/0015812 A1    Jan. 19, 2006

Related U.S. Application Data

(60) Provisional application No. 60/588,307, filed on Jul. 15, 2004.

(51) Int. Cl.
*G06F 17/00* (2006.01)
(52) U.S. Cl. ............... 715/758; 715/751; 715/752; 455/466
(58) Field of Classification Search ........... 715/763, 715/863, 751, 758; 455/466
See application file for complete search history.

(56) References Cited

U.S. PATENT DOCUMENTS

| | | | | |
|---|---|---|---|---|
| 6,594,616 | B2 * | 7/2003 | Zhang et al. | 702/152 |
| 6,629,793 | B1 * | 10/2003 | Miller | 400/472 |
| 6,980,200 | B2 * | 12/2005 | Goren | 345/169 |
| 7,016,704 | B2 * | 3/2006 | Pallakoff | 455/566 |
| 7,129,932 | B1 * | 10/2006 | Klarlund et al. | 345/168 |
| 7,292,870 | B2 * | 11/2007 | Heredia et al. | 455/466 |
| 2005/0248527 | A1 * | 11/2005 | Scott | 345/156 |
| 2005/0275633 | A1 * | 12/2005 | Varanda | 345/173 |
| 2006/0119582 | A1 * | 6/2006 | Ng et al. | 345/168 |
| 2006/0223502 | A1 * | 10/2006 | Doulton | 455/413 |

FOREIGN PATENT DOCUMENTS

WO    WO03067417 A1    8/2003

OTHER PUBLICATIONS

EmoMail, www.maxplugs.com, copyright 2002-2003 MaxPlugs, pp. 1-3, http://web.archive.org/web/20030508164749/http://www.maxplugs.com/emomail/.*
Supplementary European Search Report, mailed Aug. 4, 2009, in EP App. No. 05772941.0, 9 pages.

* cited by examiner

*Primary Examiner*—Stephen S Hong
*Assistant Examiner*—Matthew J Ludwig
(74) *Attorney, Agent, or Firm*—Zagorin O'Brien Graham LLP

(57) ABSTRACT

A method and system for generating a displayable icon or emoticon form that indicates the mood or emotion of a user of the mobile station. A user of a device, such as a mobile phone, is provided with a dedicated key or shared dedicated key option that the user may select to insert an emoticon onto a display or other medium. The selection of the key or shared dedicated key may result in the insertion of the emoticon, or may also result in the display of a collection of emoticons that the user may then select from using, for example, a key mapping or navigation technique.

20 Claims, 8 Drawing Sheets

USING EMOTICONS, SUCH AS FOR WIRELESS DEVICES

CROSS-REFERENCE TO RELATED APPLICATION

This application claims priority to U.S. Provisional Application No. 60/588,307, filed Jul. 15, 2004, which is herein incorporated by reference.

BACKGROUND

Written communication plays an integral role in modern social, economic, and cultural life. Writing facilitates the transfer and preservation of information and ideas. However, without direct access to facial expression, body language, and voice inflection, the potential for misunderstanding written communications is considerable.

The Internet culture has developed emoticons as a way to compensate for some of the limitations of written communication. The term "emoticon" is shorthand for "emotive icon." Emoticons are typically comprised of a sequence of characters and symbols that connote some emotional state. Emoticons commonly appear in email, chat, text messaging, and other forms of written, electronic communication to express moods or tone in ways that text alone cannot. For example, ':-)' is frequently used to indicate pleasure, ':-(' displeasure. Typically, users manually input a sequence of characters and symbols to construct an emoticon. In many applications, the sequence is automatically converted into a graphic. The following provides an example of currently used emoticons, and the key strokes involved in their input.

| Emoticon: | Description: |
|---|---|
| :-) or :) | Smile |
| ;-) or ;) | Wink |
| :-D or :D | Big smile |
| :-)) or :)) | Very happy |
| :0) | Big nose smiley |
| l-) | Cool! |
| >:-) or >:) | Evil grin |
| >;-> or >;> | Evil grin with a wink |
| :-X or :X | My lips are sealed |
| }:-) or }:) | Devilish |
| :- ) or :- ) | Tongue in cheek |
| :-P or :P | Sticking out tongue |
| :-& or :& | Tongue tied |
| :op | Puppy face |
| 0:-) or 0:) | Saint |
| :-)8 or :)8 | Happy wearing a bow tie |
| 8-) or 8) | Happy with glasses |
| #-) | I partied all night |
| %-) or %) | Drunk |
| :-###.. or :###.. | Being sick |
| %-( or %( | Confused |
| :-0 or :0 | Shocked |
| :-o or :o | Surprised |
| :-l or :l | Indecision |
| :'-( or :'( | Crying |
| :'-) or :') | Crying of happiness |
| :-( or :( | Sad |

Increased access to written communications on mobile devices has brought emoticons to the wireless world. Given the compact nature of the typical mobile device, however, inputting emoticons on a mobile device can be a cumbersome and time-consuming process. This problem is further exacerbated as the base of commonly used emoticons grows to include new emoticons, which are often built from increasingly long and complex strings of characters and symbols.

Figure 1:
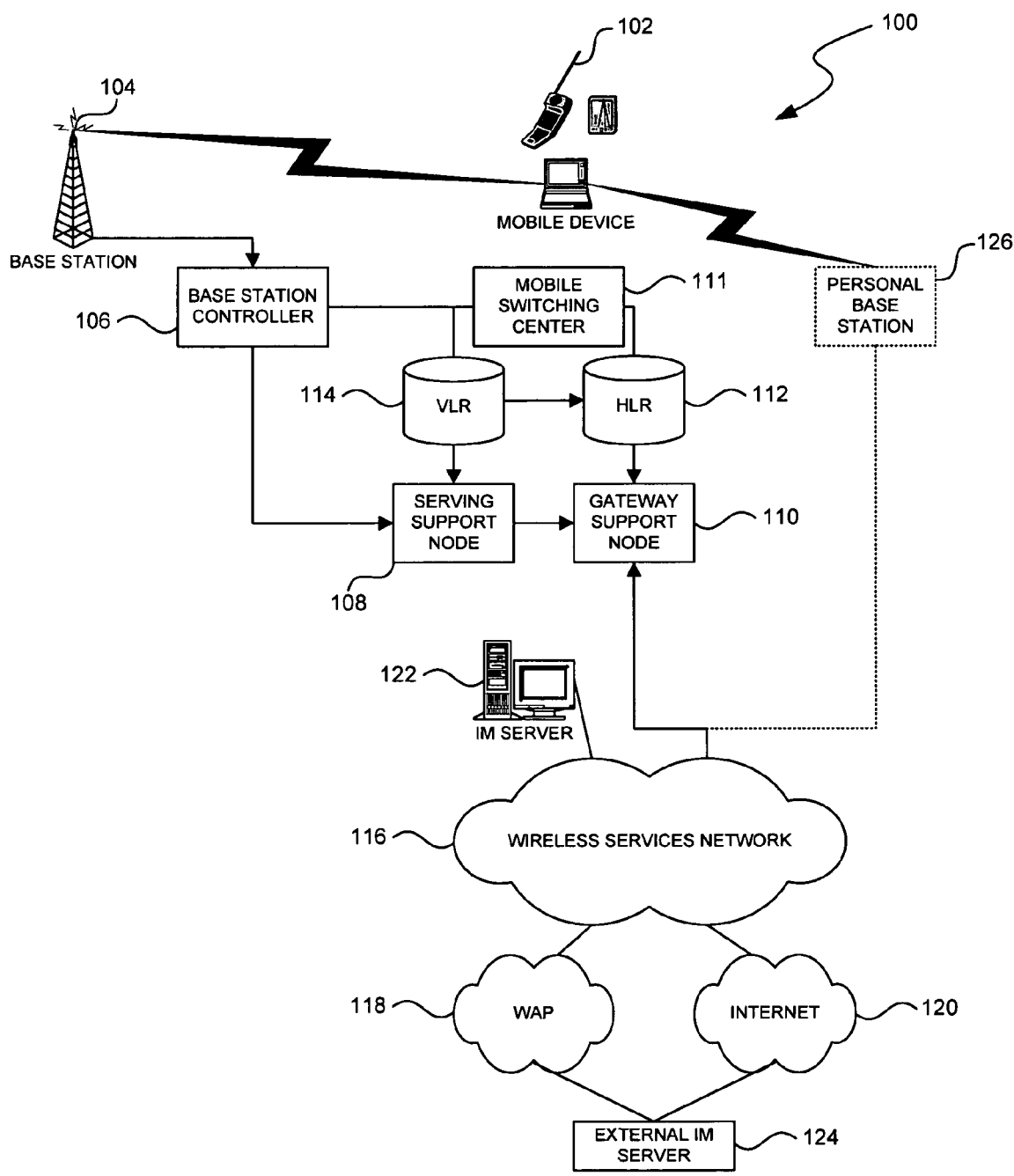
FIG. 1 is a block diagram showing an example of a system for providing access to emoticons in one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

The method and system described herein allow a user of a mobile station or other device to easily select a displayable icon, such as an emoticon, that indicates the mood or emotion of the user or conveys other information independent of text. In some embodiments, the selected displayable icon is inserted into a text message or screen, such as an instant message, chat screen, or user text field.

The emoticon can be generated using one of a number of techniques. In one embodiment, the user selects a dedicated emoticon key or shared dedicated emoticon key to bring up a screen showing a collection of emoticons (palette), from which the user can interactively select the desired emoticon. A routine then inserts the emoticon into a message at a current location. The technique can also, or alternatively, implement a collection of labeled and dedicated keypad or touch screen buttons for the most commonly used emoticons, such as a dedicated smiley or frowney face, which could be used to bypass the palette selection method.

The system may also support the import of emoticons and custom emoticons to one or more applications running on the mobile device. For example, in some embodiments, users may visit an out-of-band service (e.g., web page) to compose or upload custom emoticons that would then become available on the wireless device's palette.

In addition to small mobile devices, the technique can be applied to any number of devices or communication methods. For example, an emoticon button or key, such as one described above (and in the text that follows) can be added to television or cable remote controls and used to interactively rate programs or events. In this way, interacting participants can provide a broad range of reactions to a program or event. In a further example, the technique can be applied to a variety of messaging medium or input methods. For example, an emoticon button can be added to standard PC keyboards.

II. Representative System

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multiprocessor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), or on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a system 100 on which the emoticon selection technique can be implemented provides various networked components. The system of FIG. 1 is an example of a GPRS (general packet radio service) system based on GSM (global system for mobile communication). However, the invention may be implemented on other types of systems, including UMTS (universal mobile telecommunication system), EDGE (enhanced data rates for GSM evolution, etc.), CDMA code division multiple access), IS-136, analog, etc. The system may also include various wired or partially wired networks, such as the Internet, a wired LAN (local area network), or even public switched telephone network (PSTN). While not all types of networks are described here, the invention may be implemented within the framework of many types of networks.

The system 100 includes a mobile device 102 (e.g., mobile phone, PDA, wireless laptop, etc.) in communication with a base station 104. A base station controller 106 in communication with a serving GPRS support node (SGSN) 108 and a gateway GPRS support node (GGSN) 110 together support packet switched transactions, which are handled separately from circuit switched traffic that is supported by a mobile switching center (MSC) 111. The MSC 111 also serves as an access point for the PSTN (not shown).

The SGSN 108, GGSN 110, and MSC 111 interact with a home location register (HLR) 112. In some embodiments, the HLR 112 is the primary database of permanent subscriber/customer information for the service provider's mobile network. In the context of activated devices, the HLR 112 may contain pertinent user information, including address information, account status, and preferences. In some embodiments, a visiting location register (VLR) 114 manages requests from out-of-area subscribers who are out of the area covered by their home system.

In the illustrated embodiment, the system includes a wireless services network 116. Other networks that may be related to the system 100 include a Wireless Application Protocol (WAP) network 118 and the Internet 120. The wireless services network 116 may be associated with an instant messaging (IM) server 122 that manages instant messaging for users of the network. In addition to the IM server 122, in some embodiments, users may access external instant messaging web sites or servers 124 (e.g., America Online Instant Messaging (AIM) or MSN Instant Messaging). For example, users may download emoticons from such sites or servers.

The system 100 may include one or more optional personal base stations (PBSs) 126 that enable customers to integrate their wireless phones into a fixed, home-based system. In some embodiments the PBS 126 is located in or near the home or business of the user. The PBS 126 effectively treats the mobile device as a short-range mobile device (e.g., cordless phone) when the user is inside the home or business. When the mobile device leaves the range of the PBS, it then communicates via regular base stations, such as base station 104.

Figure 2:
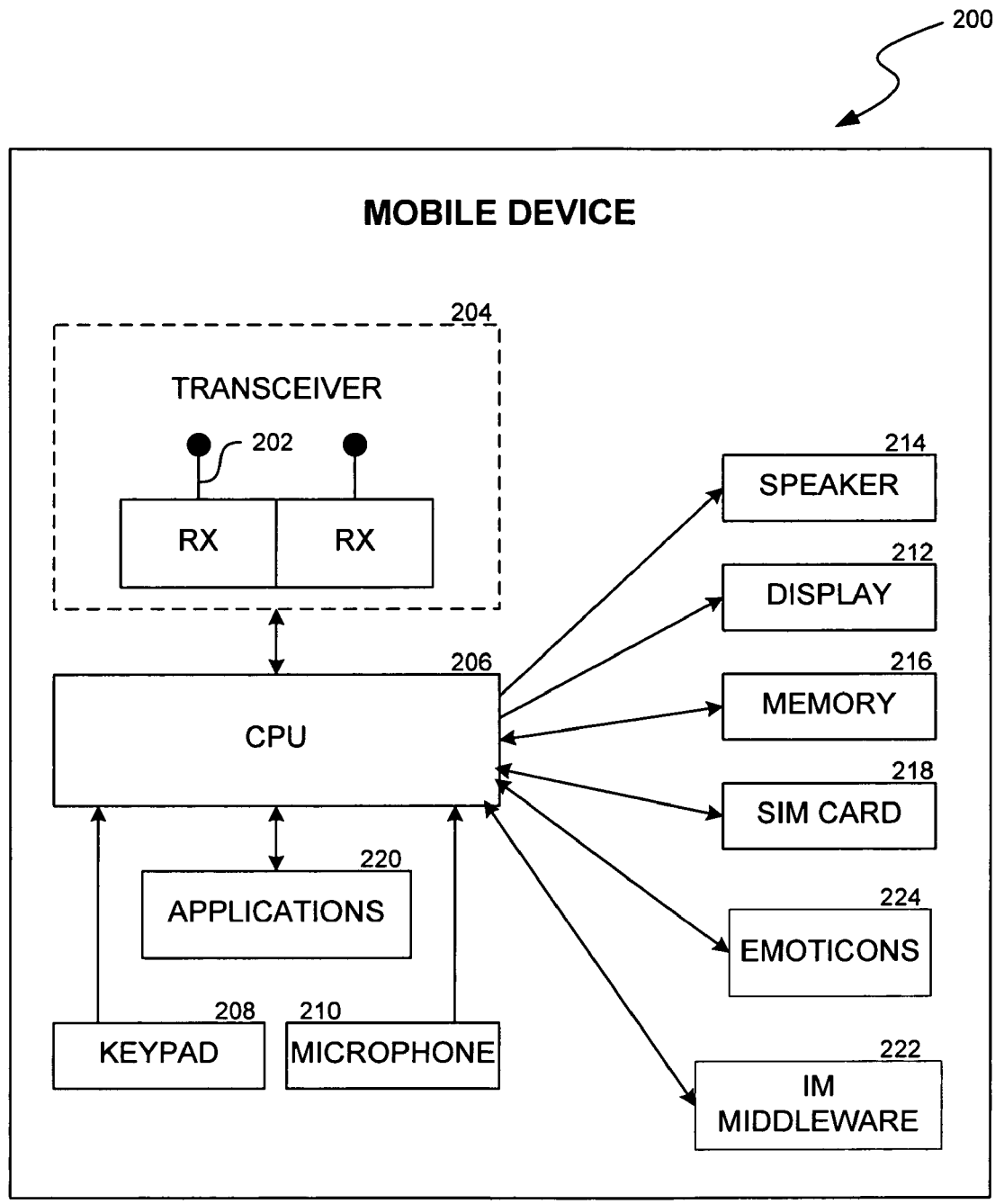
FIG. 2 is a block diagram showing an example implementation of the mobile device of FIG. 1.

FIG. 2 shows a block diagram of a typical mobile communication device 200, such as a mobile handset. While a mobile phone is shown as the mobile communication device in FIG. 1, those skilled in the relevant art will appreciate that the invention can be practiced with other devices and configurations, including Internet appliances, hand-held devices, wearable computers, multiprocessor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer may provide input to the processor unit 206 via a keypad 208, microphone 210, or display/touchpad 212. While not illustrated, other input devices may be used, including a keyboard, a touch-sensitive screen, a pointing device such as a mouse or pen, a joystick, a game pad, a scanner, etc.

In turn, the processor unit 206 may provide information to the customer via the display/touchpad 212 or a speaker 214.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communication systems, or other well-known memory storage technologies, such as "smart cards." Applications 220, including instant messaging applications, wireless content browser applications, and address book applications can be implemented in either the removable memory 218 or the nonremovable memory 216.

In the illustrated embodiment, the mobile device includes IM middleware 222 or an IM aggregator program so that the user of the mobile device can engage in instant messaging. The mobile device 200 also includes an application or applications related to emoticons 224 or similar displayable icons. In this way, when the user selects an emoticons key on the keypad or touch screen, the appropriate emoticons can be displayed on the mobile device display 212. However, in alternate embodiments, all or part of the functionality provided by the IM middleware 222 and/or emoticon applications 224 may be handled remotely (e.g., by the IM server 122 of FIG. 1, or by the external IM servers 124).

Unless described otherwise below, aspects of the invention may be practiced with conventional systems. Thus, the construction and operation of the various blocks shown in FIGS. 1 and 2 may be of conventional design, and need not be described in further detail herein to make and use the invention, because such blocks will be understood by those skilled in the relevant art. One skilled in the relevant art can readily make any modifications necessary to the blocks in FIGS. 1 and 2 (or other embodiments or Figures) based on the detailed description provided herein.

III. User Interface

The user interface of a mobile device configured for easy access to emoticons may include various keypad configurations, user screens, views, and other interfaces that allow users to easily select and use emoticons. Examples of such screens and keypads are described with respect to FIGS. 3-5. While only certain examples are given, a person skilled in the art will appreciate that many other interfaces and related techniques can be implemented without departing from the scope of the invention.

The terms "screen," "window," and "page" are generally used interchangeably herein. The pages described herein may be implemented using, for example, WML (wireless markup language), XHTML (extensible hypertext markup language), XML (extensible markup language), or HTML (hypertext markup language). In some embodiments, WML and XHTML decks offer similar functionality but may differ with respect to style guide and design requirements between the two languages (use of color, icons, etc.). The look and feel of WML pages are primarily text-based, with underlining used to highlight clickable links. XHTML is a richer development language, allowing the mobile device to present content that may stand out on many different levels. For example, XHTML may allow the use of front and background colors, bolding, and icons.

While certain ways of displaying information to users are shown and described with respect to certain Figures, those skilled in the relevant art will recognize that various other alternatives may be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other) where the layout and information or content to be displayed on the page is stored in memory, database, or another storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

In general, for ease in describing features of the invention, aspects of the invention will now be described in terms of a user interacting with the mobile device to select emoticons.

Figure 3:
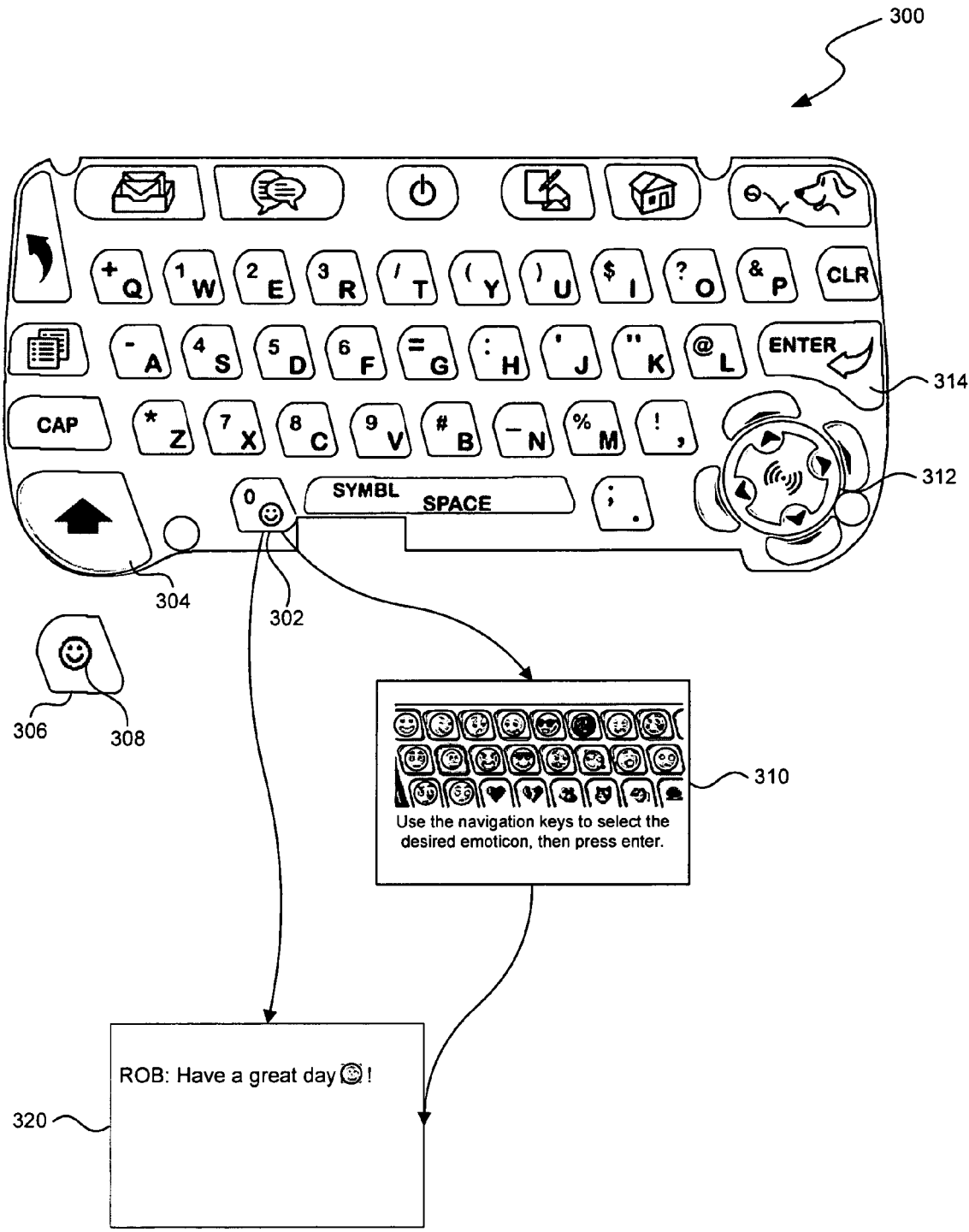
FIG. 3 is a display diagram showing a combination of interfaces for selecting an emoticon in the system of FIG. 1.

Referring to FIG. 3, the user may generate an emoticon using a specialized keypad 300. The keypad 300 includes a special emoticon key 302. In the illustrated embodiment, the emoticon key 302 is a shared dedicated key, meaning that it is shared with another symbol (e.g., the numeral zero). Accordingly, to select the emitted icon key, the user selects an Alt or Shift key 304 (depicted here as an upward facing arrow) to activate the emoticon key 302. In another embodiment, the shared dedicated emoticon key 302 may be replaced with a nonshared emoticon key such as dedicated key 306. As shown, the shared dedicated emoticon or dedicated key (302 or 306) includes a label 308 of a commonly used emoticon (e.g., a smiley face).

Once the user selects the shared dedicated emoticon or dedicated key (302 or 306), the device displays a collection of emoticons on a palette or menu as shown on a screen 310. The collection of emoticons may include a set of emoticons from a known IM provider (e.g., Yahoo! or America Online Instant Messaging). In general, the number, theme, and style of emoticons may vary between communities (e.g., AOL Instant Messaging, MSN Instant Messaging, custom, etc.) However, certain emoticons are common to most communities. These common emoticons may consistently be placed in the same key mapping location for each community, for ease of use.

In the illustrated embodiment, the user uses a navigation key or keys 312 on the keypad 300 to scroll through the collection of emoticon keys displayed on the screen 310. When the user selects the appropriate key (e.g., an Enter key 314), the emoticon appears in the display, as shown on a screen 320 (showing text for an instant message or chat—i.e., "Have a great day!"). In some embodiments, simply pressing a key on the keypad 300 inserts the corresponding emoticon into the user text entry field in the chat or instant message, then closes the palette. In some embodiments, a user may display a second set of emoticons via the Alt key 304. For example, pressing the Alt key 304 when an MSN palette is open on the screen 310 may change the emoticon display to a second palette containing a second collection of emoticons. In some embodiments, if no emoticon is inserted after the palette of the screen 310 is displayed, pressing the emoticon key (302 or 306) closes the palette.

As shown on the screen 320, the display of the selected emoticon may be a graphical display that is similar in appearance to the emoticons displayed in the graphical menu of the screen 310. However, in some embodiments (e.g., where graphical displays are not available), the emoticon may be displayed as a combination of text characters. In some embodiments, the emoticon may be animated or may include sounds that accompany it.

The nature of the display of the emoticon on the user's screen may not always match what is displayed on a receiver's device. For example, in some embodiments, an emoticon that shows up as a graphic icon on the user (sender) screen may be transmitted to the receiver in the form of text (or alternatively, as a graphic or other image). It may then be displayed on the receiver's screen as a series of text characters, as a graphic, or in some other form, depending on the capabilities of the receiver's device and associated service.

In some embodiments, selection of the shared dedicated emoticon key or dedicated emoticon key (302 or 306) results directly in the generation and display of the emoticon as shown on the screen 320, so that the menu screen 310 step may be skipped. Where this is the case, the keypad 300 may include multiple emoticon keys for selection by the user. An example of this is shown in FIG. 4.

Figure 4:
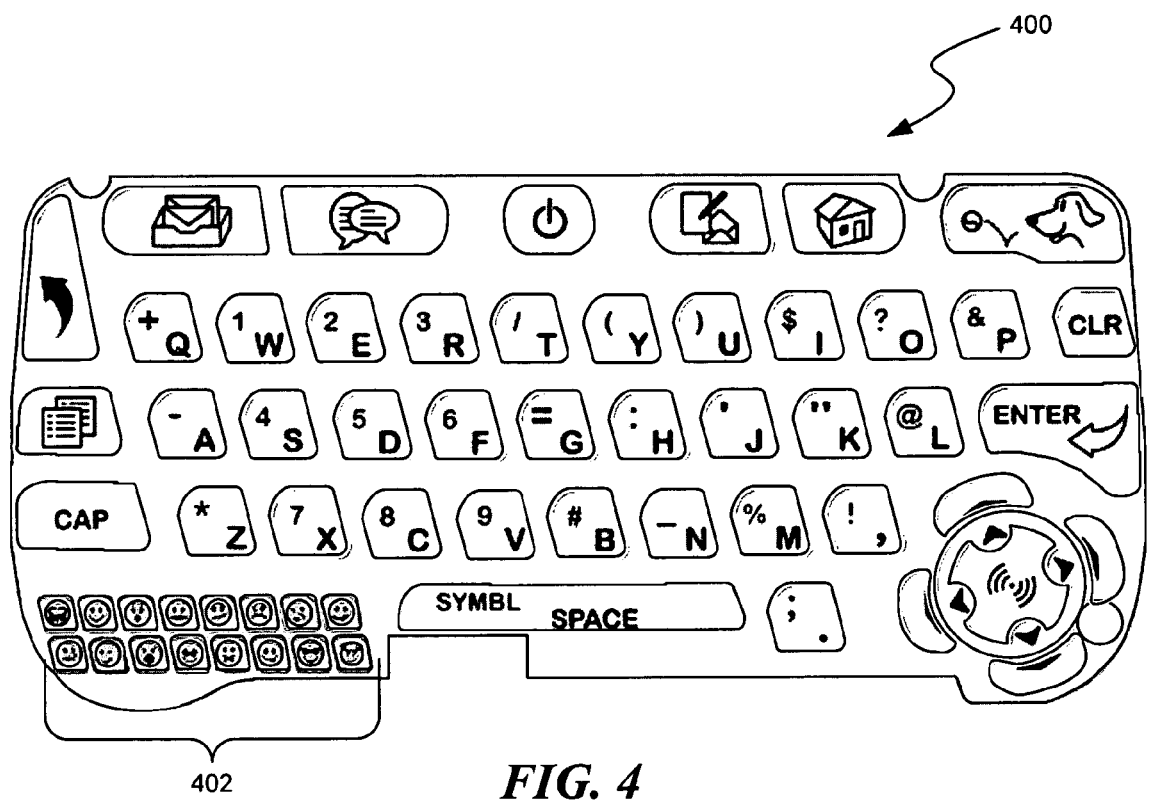
FIG. 4 is a display diagram showing an example of a mobile device keypad for selecting emoticons in one embodiment.

Referring to FIG. 4, a keypad 400 with multiple dedicated emoticon keys 402 is shown. Using the configuration of keypad 400, the user may select directly from the keypad 400 to insert the emoticon that the user wishes to use. In the illustrated embodiment, the single action of selecting one of 16 dedicated emoticon keys 402 results in the generation and display of an emoticon symbol on the display screen (e.g., in the user's instant message or chat field).

Figure 5:
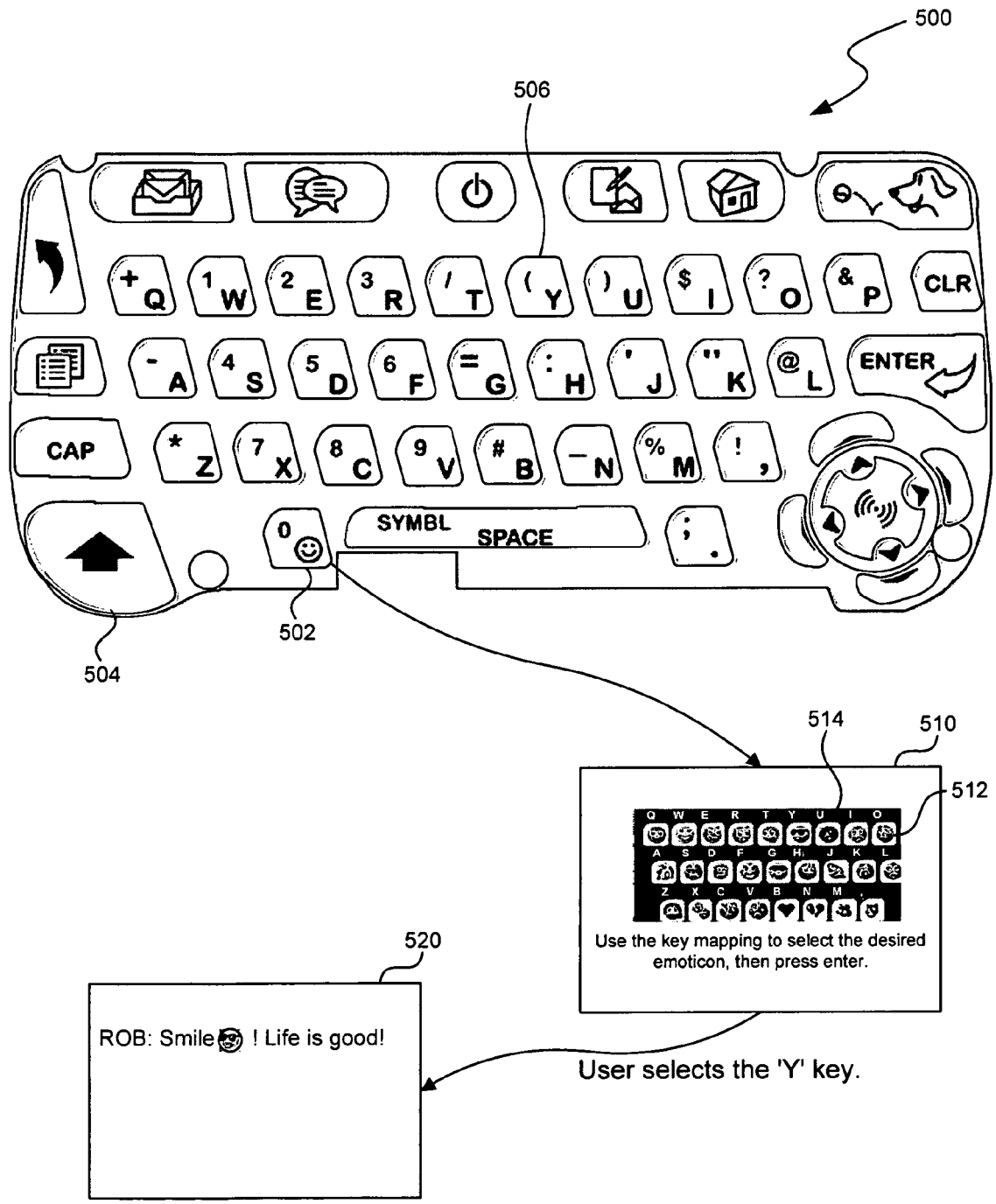
FIG. 5 is a flow diagram showing a second combination of interfaces for selecting an emoticon in one embodiment.

Referring to FIG. 5, a mapping technique may be used to select an emoticon from a collection of emoticons (palette) that is displayed after the dedicated or shared dedicated emoticon key is selected. In the illustrated embodiment, a keypad 500 has a shared dedicated emoticon key 502. To select the shared dedicated emoticon key 502, the user selects an Alt key 504 followed by the shared dedicated emoticon key 502. After the user selects these two keys, a screen 510 displays a mapping 512 of emoticon keys. Each of the emoticons shown on the screen 510 maps with a key on the physical keypad 500. For example, a "smiley face with sunglasses" emoticon key 514 maps with a "Y" key 506 on the physical keypad 500. Accordingly, after the mobile device displays the screen 510, selecting the appropriate or desired emoticon is just one key away, as shown on a screen 520.

In short, any combination or variation of the above-described techniques may be used to allow the user to easily insert emoticons. In addition to a dedicated or shared dedicated emoticon key, other keypad, touch screen, or user input device techniques keys may be used to control emoticon input. A sample of control features in one embodiment is shown in Table 1 below.

TABLE 1

| Req. No. | Control Name | Control Symbol or Icon | Description |
| --- | --- | --- | --- |
| | Up/Down Direction Navigation Buttons | | Navigating the emoticons palette |
| | Page Up/Down Controls | | Navigates to the top or bottom for most position of the highlighted Emoticons palette column. |
| | Left/Right Direction Navigation Dial Buttons | | Navigates the emoticons palette. |
| | TAB Navigation Left/Right controls | | Navigates to the left or right for most positions of the highlighted Emoticon palette row. |
| | Option Menu | | No action |
| | Enter/Carriage Return Key | | Inserts the highlighted Emoticon to the IM user text field. |
| | Any letter key | | Approach 1 - Insert the corresponding emoticon into the user enter text field, closes palette. Approach 2 - N/A |
| | Clear key | | No action |

TABLE 1-continued

| Req. No. | Control Name | Control Symbol or Icon | Description |
|---|---|---|---|
| | Emoticons palette key | | Open/Close palette |
| Compose | Other Function Buttons (Chat/Compose/Home/Fetch/ Power-Quick Settings) | | Closes palette; opens corresponding screens or Popups |
| | Up | | Closes palette |

IV. System Flows

Figure 6:
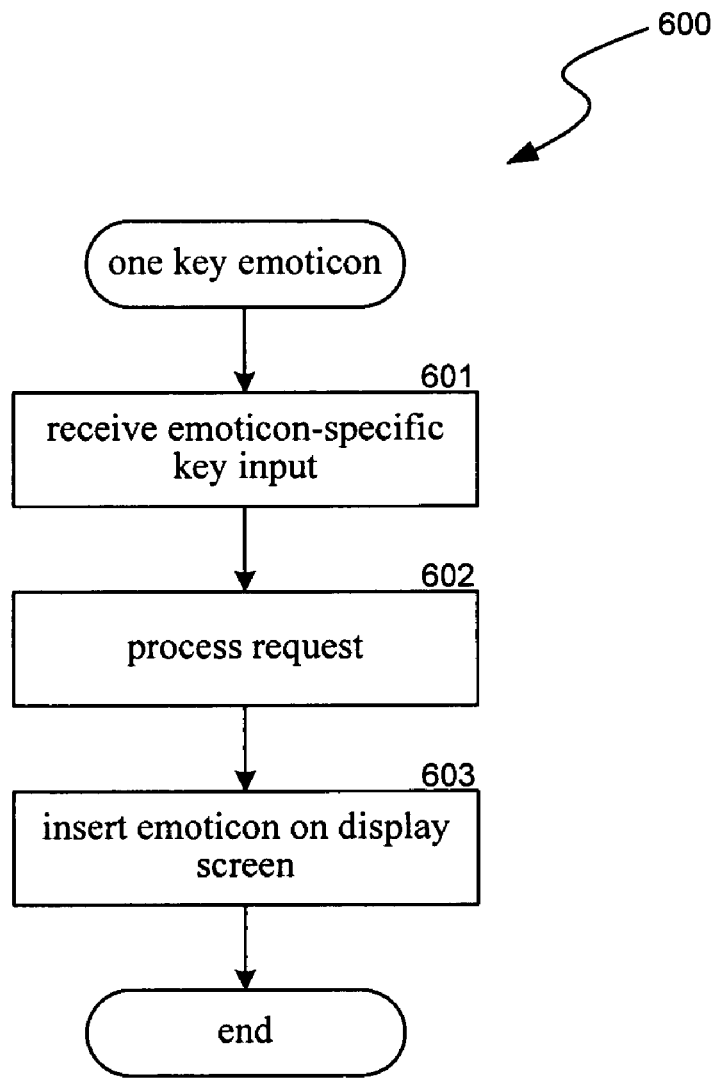
FIG. 6 is a flow diagram showing a routine for selecting an emoticon using a single dedicated key or shared dedicated key in one embodiment.
Figure 7:
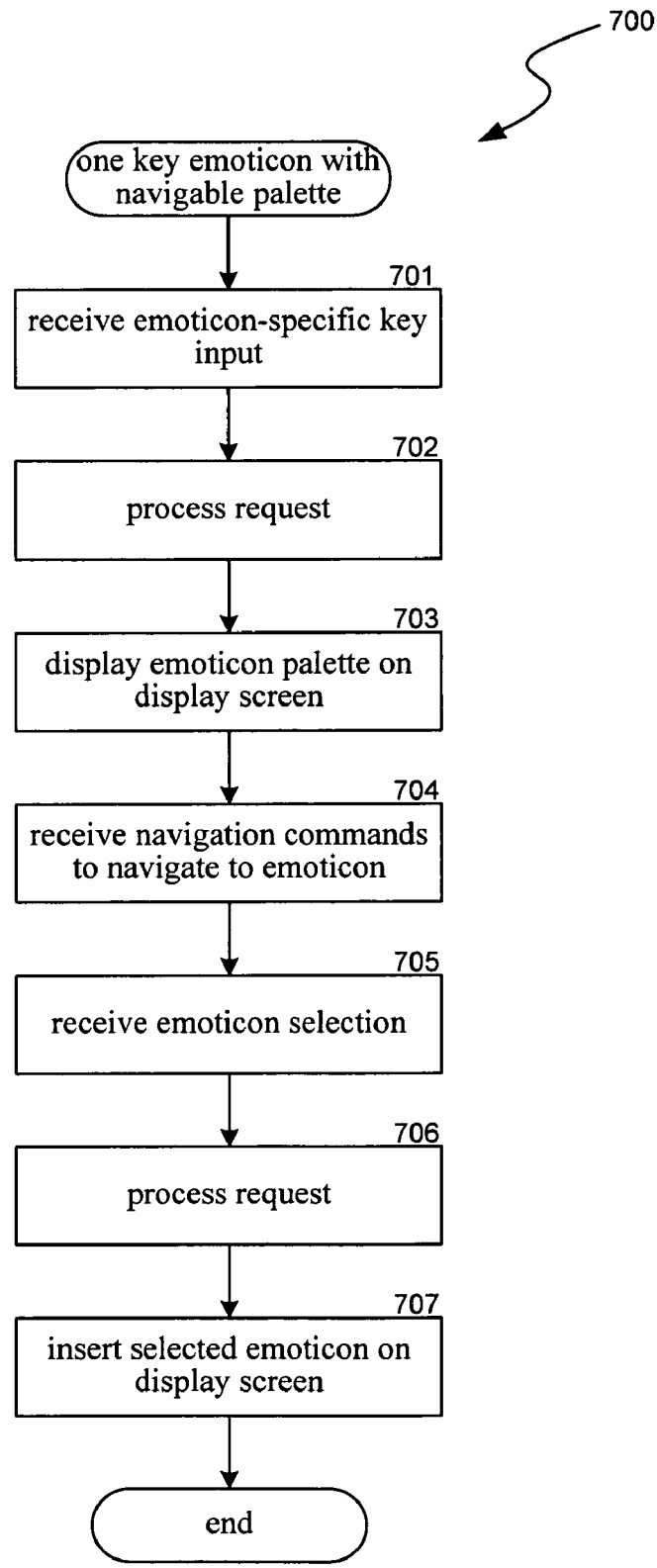
FIG. 7 is a flow diagram showing a routine for selecting an emoticon using a single dedicated key (or shared dedicated key) and a navigable palette in one embodiment.
Figure 8:
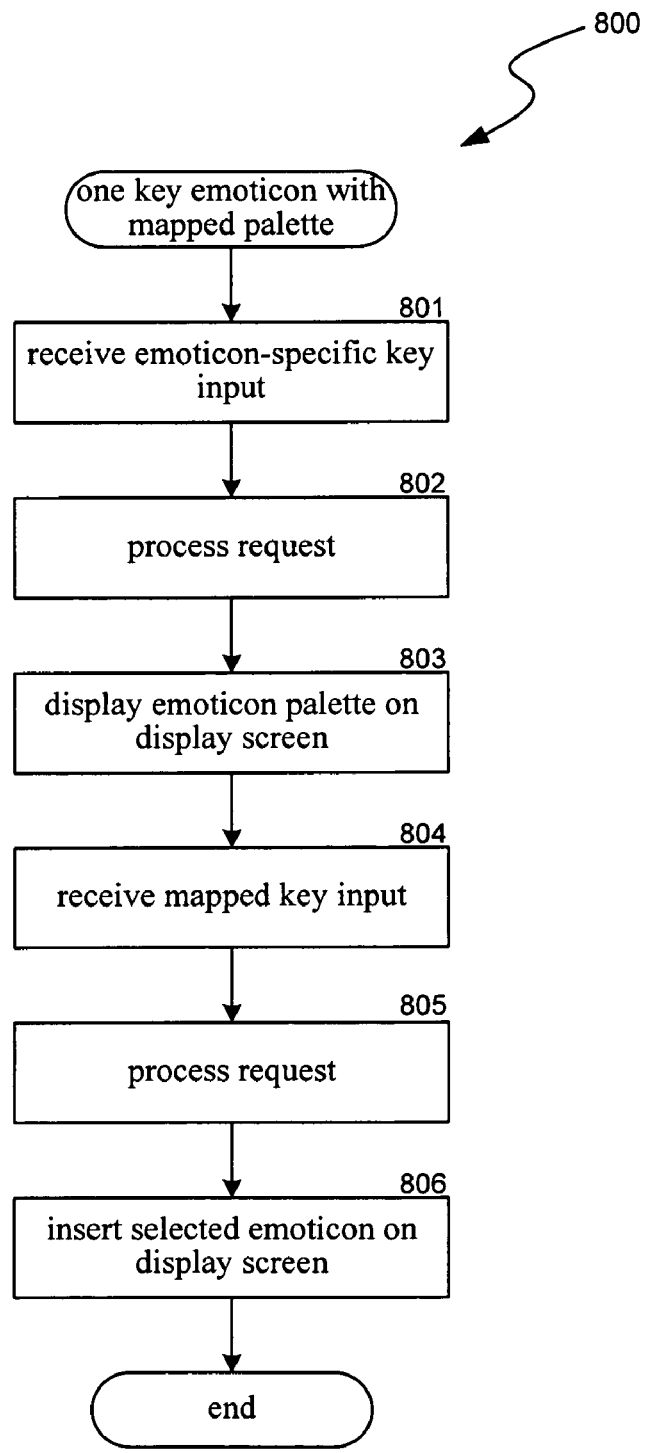
FIG. 8 is a flow diagram showing a routine for selecting an emoticon using a single dedicated key (or shared dedicated key) and a mapped palette in one embodiment.

FIGS. 6-8 are representative flow diagrams that show processes or routines that occur within the mobile device of FIGS. 1 and 2. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented.

Referring to FIG. 6, a routine 600 for selecting an emoticon using one keystroke is shown. At block 601, the device receives the emoticon-specific key input (e.g., selection of a dedicated or shared dedicated emoticon key on the keypad or touch screen display). At block 602, the routine 600 processes the request triggered by selection of the key(s) (i.e., generate/ insert emoticon). In some embodiments, the routine 600 processes the request entirely at the mobile device. However, in other embodiments, the request may be processed, at least in part, at the mobile service provider (internal IM server 122) or at the external IM server 124, such as those described with respect to FIG. 1. At block 603, the routine 600 inserts an emoticon at the appropriate position on the display screen. For example, the routine 600 may insert the emoticon at a cursor in a text message (e.g., instant message or chat field). The routine 600 then ends.

Referring to FIG. 7, a routine 700 for inserting an emoticon using a navigable palette is shown. At block 701, the routine 700 receives input from the selection of a dedicated or shared dedicated emoticon key. At block 702, the routine 700 processes the request. This may involve retrieving an emoticon palette from a remote server or, alternatively, retrieving an emoticon palette from a locally stored application running on the mobile device. At block 703, the routine 700 displays the emoticon palette on the display screen of the device. At block 704, the routine 700 receives a navigation command to navigate to a selected emoticon on the palette or menu. At block 705, the routine 700 receives an emoticon selection. For example, this may be done using one or more navigation keys. At block 706, the routine 700 processes the request for the selected emoticon. At block 707, the routine 700 inserts the selected emoticon on the display screen of the device. The routine 700 then ends.

Referring to FIG. 8, a routine 800 for inserting an emoticon using a mapped palette technique is shown. At block 801, the routine 800 receives input from the selection of a dedicated or shared dedicated emoticon key from the keypad or touch screen. At block 802, the routine 800 processes the input request. For example, the routine 800 could retrieve a palette or menu of emoticons for display on the screen. As with the routine 700 of FIG. 7, this may include retrieving an emoticon or emoticon palette remotely or from an application stored locally on the device. At block 803, the routine 800 displays an emoticon palette on the display screen of the device. Along with the emoticons, the display palette may also include an indication of a key mapping so that the user can know which key on the keypad corresponds to the desired emoticon. At block 804, the routine 800 receives a mapped key input. For example, if the user wants to select an emoticon of a smiley face, the user searches the palette for the appropriate emoticon, notes the associated key on the keypad, and selects that key. At block 805, the routine 800 processes the request for the selected emoticon. At block 806, the routine inserts the selected emoticon on the mobile device display screen. The routine 800 then ends.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively, where the context permits.

The teachings of the invention provided herein can be applied to other systems, not necessarily the system described herein. The elements and acts of the various embodiments described above can be combined to provide further embodiments.

This application is related to the following commonly assigned and co-pending U.S. Patent Applications: U.S. Patent Application No. 60/587,792, filed Jul. 15, 2004, entitled "Selection of Bearer Mode According to Message Characteristics" (previously entitled "Smart Compose for Wireless Devices"), U.S. Patent Application No. 60/588,018, filed Jul. 15, 2004, entitled "Maintaining Instant Message Session Status in Dynamic Operating Environment" (previously entitled "Automated IM Status Changing"), U.S. Patent Application No. 60/585,965, filed Jul. 15, 2004, entitled "System and Method for Data Organization and Display in an Instant-Messaging Interface" (previously entitled "IM Community Aggregation"), U.S. Patent Application No. 60/590,185, filed Jul. 15, 2004, entitled "Dedicated Wireless Device Business Model," U.S. Patent Application No. 60/590,229, filed Jul. 15, 2004, entitled "Always-On Mobile Instant Messaging of A Messaging Centric Wireless Device" (previously entitled "Always On Mobile IM/Messaging Centric Wireless Device"), and U.S. Patent Application No. 60/588,110, filed Jul. 15, 2004, entitled "Customer Service Messaging, Such As On Mobile Devices." All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, the invention can be practiced in many ways. Details of the emoticon generation/input techniques may vary considerably in their implementation details, while still being encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for generating a displayable emoticon on a display component of an electronic device, the method comprising:
    displaying an expandable palette comprising a plurality of emoticons, the plurality of emoticons being mapped to a plurality of first corresponding keys of the electronic device;
    receiving an external emoticon from an external source, wherein the external emoticon is added to the expandable palette and mapped to a second corresponding key of the electronic device;
    receiving a selection of the second corresponding key; and
    in response to the selection, generating a displayable image of the external emoticon corresponding to the second corresponding key for display on the display component of the electronic device.

2. The method of claim 1, further comprising receiving a signal indicative of a selection of the external emoticon for inclusion in an electronic mail message of an electronic mail application running on the electronic device, wherein the external emoticon is displayed in the electronic mail message.

3. The method of claim 1, further comprising receiving a signal indicative of a selection of the external emoticon for inclusion in an instant message of an instant messaging application running on the electronic device, wherein the external emoticon is displayed in the instant message.

4. The method of claim 1, wherein the external emoticon is a custom emoticon from the external source.

5. The method of claim 4, wherein the custom emoticon is a user-composed emoticon.

6. The method of claim 1, further comprising displaying the expandable palette upon selection of a physical key of the electronic device.

7. The method of claim 1, further comprising displaying information of the first and second corresponding keys upon selection of a physical key of the electronic device.

8. The method of claim 1, wherein at least one of the first and second corresponding keys comprises a physical key of the electronic device.

9. The method of claim 1, wherein at least one of the first and second corresponding keys comprises a virtual key of a virtual keypad displayed on a touch-sensitive display component of the electronic device.

10. The method of claim 1, wherein the external emoticon is received from the external source following a predetermined payment by a user.

11. The method of claim 1, wherein the electronic device is a mobile communications device.

12. The method as recited in claim 1 wherein the external emoticon is made available responsive to use of an out-of-band service.

13. An electronic device for use by a user in a wireless network, comprising:
- a memory configured to store an expandable palette comprising a plurality of emoticons and a mapping of the plurality of emoticons to a plurality of first corresponding keys of the electronic device;
- a wireless transceiver configured to receive an external emoticon from an external source;
- a processor coupled to the memory and wireless transceiver, the processor configured to add the external emoticon to the expandable palette and to add a mapping of the external emoticon to a second corresponding key of the electronic device;
- user input means coupled to the processor for receiving respective selections of the second corresponding key and at least one of the first corresponding keys; and
- a display component coupled to the processor;
- wherein the processor means is configured to generate a display of emoticons corresponding to the respective selections on the display component of the electronic device.

14. The electronic device of claim 13, wherein the external emoticon is a custom emoticon from the external source.

15. The electronic device of claim 14, wherein the custom emoticon is a user-composed emoticon.

16. The electronic device of claim 13, wherein at least one of the first and second corresponding keys comprises a physical key of the electronic device.

17. The electronic device of claim 13, further comprising a touch-sensitive display component, wherein at least one of the first and second corresponding keys is a virtual key of a virtual keypad displayed on the touch-sensitive display component.

18. The electronic device of claim 13, wherein the processor is configured to permit a user to compose a textual message using a messaging application on the electronic device and to include the emoticons corresponding to the respective selections as part of the textual message, wherein the emoticons corresponding to the respective selections are displayed in conjunction with the textual message.

19. The electronic device of claim 13, wherein the electronic device is a mobile communications device.

20. An electronic device for use by a user in a wireless network, comprising:
- a memory configured to store a palette comprising a plurality of emoticons and a mapping of the plurality of emoticons to a plurality of keys of the electronic device;
- the electronic device being configured to receive additional emoticons from an external source via a wireless transceiver and add the additional emoticons to the palette including a mapping of the additional emoticons to respective keys of the electronic device;
- a processor coupled to the memory and wireless transceiver, the processor and memory configured to allow a user to utilize at least one of the plurality of emoticons in a message;
- the processor and memory being further configured to allow the user to include at least one of the additional emoticons in the message;
- user input means coupled to the processor for receiving a selection of at least one of the additional emoticons and the plurality of emoticons; and
- a display component coupled to the processor to display the selection.

* * * * *